US012378978B2

(12) United States Patent
Aryee-Dematteis et al.

(10) Patent No.: US 12,378,978 B2
(45) Date of Patent: Aug. 5, 2025

(54) DIAGNOSTIC VALVE ISLAND

(71) Applicant: Norgren Limited, Lichfield (GB)

(72) Inventors: Francesca Aryee-Dematteis, Birmingham (GB); Ronald Bennett, Birmingham (GB); Ray Last, Birmingham (GB); Christopher Patient, Birmingham (GB); Anna Wicik, Birmingham (GB); Lee Keeling, Birmingham (GB); George Bell, Birmingham (GB); Gary Manning, Birmingham (GB)

(73) Assignee: Norgren Limited, Lichfield (GB)

( * ) Notice: Subject to any disclaimer, the term of this patent is extended or adjusted under 35 U.S.C. 154(b) by 36 days.

(21) Appl. No.: 18/015,352

(22) PCT Filed: Jul. 9, 2021

(86) PCT No.: PCT/GB2021/051760
§ 371 (c)(1),
(2) Date: Jan. 10, 2023

(87) PCT Pub. No.: WO2022/008926
PCT Pub. Date: Jan. 13, 2022

(65) Prior Publication Data
US 2023/0341068 A1     Oct. 26, 2023

(30) Foreign Application Priority Data
Jul. 10, 2020  (GB) .................................... 2010671

(51) Int. Cl.
*F15B 13/08*     (2006.01)
*F15B 19/00*     (2006.01)
(Continued)

(52) U.S. Cl.
CPC ...... *F15B 13/0817* (2013.01); *F15B 13/0807* (2013.01); *F15B 13/0821* (2013.01);
(Continued)

(58) Field of Classification Search
CPC .. F16K 37/0058; F16K 37/005; F16K 27/003; F15B 13/0817; F15B 13/0839;
(Continued)

(56) References Cited

U.S. PATENT DOCUMENTS

| 2004/0051381 A1 | 3/2004 | Garner et al. |
| 2009/0139591 A1* | 6/2009 | Okamoto ............ F15B 13/0825 137/884 |
| 2021/0131459 A1* | 5/2021 | Weickel ................ F16K 37/005 |

FOREIGN PATENT DOCUMENTS

| DE | 103 16 129 A1 | 10/2004 |
| EP | 1 186 814 A2 | 3/2002 |

(Continued)

OTHER PUBLICATIONS

International Search Report prepared by the European Patent Office in international application No. PCT/GB2021/051760 dated Feb. 1, 2022.
(Continued)

*Primary Examiner* — Atif H Chaudry
(74) *Attorney, Agent, or Firm* — McDonnell Boehnen Hulbert & Berghoff LLP (57) ABSTRACT

A modular valve island 100 comprising a plurality of valves, a supply exhaust module 6, a data communication module 7 and a diagnostic module 8. At least one of the plurality of valves has at least one integrated sensor configured to detect an operating condition of the modular valve island. The at least one integrated sensor is electrically connected to the diagnostic module 8, to send sensor signals thereto. The diagnostic module 8 is configured to receive and process the
(Continued)

sensor signals therein to identify the operating condition. The modular valve island 100 is configured to provide data relating to the operating condition of the modular valve island 100 via at least one of: a user interface provided in the diagnostic module 8; an industrial Ethernet link; or a wireless network and/or cloud communication link.

22 Claims, 6 Drawing Sheets

(51) Int. Cl.
*F16K 27/00* (2006.01)
*F16K 37/00* (2006.01)

(52) U.S. Cl.
CPC ...... *F15B 13/0825* (2013.01); *F15B 13/0835* (2013.01); *F15B 13/0882* (2013.01); *F16K 27/003* (2013.01); *F16K 37/005* (2013.01); *F16K 37/0083* (2013.01); *F16K 37/0091* (2013.01); *F15B 13/0832* (2013.01); *F15B 13/0867* (2013.01); *F15B 19/005* (2013.01)

(58) Field of Classification Search
CPC  F15B 13/0825; F15B 13/0807; F15B 13/081; F15B 13/0821; F15B 13/0835; F15B 13/0882

See application file for complete search history.

(56) References Cited

FOREIGN PATENT DOCUMENTS

| EP | 1 223 372 A2 | 7/2002 |
|---|---|---|
| EP | 1 586 780 A1 | 10/2005 |
| WO | 2012/076035 A1 | 6/2012 |
| WO | 2018/164669 A1 | 9/2018 |

OTHER PUBLICATIONS

Festo ED—Festo "Terminal CPX", Elemente Automatisierungstechnk—Pneumatik, Festo, Esslingen, Deutschland, Jul. 31, 2009, pp. 929-976.

\* cited by examiner

Fig. 4

DIAGNOSTIC VALVE ISLAND

CROSS-REFERENCE TO RELATED APPLICATIONS

This application a U.S. National Phase Application pursuant to 35 U.S.C § 371 of International Application No. PCT/GB2021/051760 filed on Jul. 9, 2021, which claims priority to GB Patent Application No. 2010671.2 filed on Jul. 10, 2020, the entire contents of all of which are hereby incorporated by reference.

TECHNICAL FIELD

This invention relates to a fluid flow control device and more particularly to valve islands comprising valves for controlling fluid-powered devices such as, for example, actuators or moveable elements. The invention is applicable to pneumatic and hydraulic control valves but, for convenience, this specification refers largely to the former.

BACKGROUND

It is now common place in, for example, production machinery for all of the actuating cylinders to be controlled by respective directional control valves that are usually mounted on one and the same 'valve island'. The valves in the valve islands are usually controlled by solenoids that receive electrical signals to actuate the associated valve. The valves control the direction of pneumatic flow operating the actuating cylinders of the production machinery. The actuating cylinders each have an operation cycle specific to a portion of the production machinery. Each control valve needs to be correctly operating to maintain correct operation of the actuating cylinders. Failure of a single control valve and its actuating cylinder may cause the entire production machinery to cease operation.

The valve islands are connected to a pneumatic line that supplies pressurized gas or air, an electrical line to provide power for the solenoids and an electrical communication line to control the operation of the valve island. Such valve islands have the advantage of compactness but each one requires the connection of electrical, communication and pneumatic lines. Therefore, production machinery having several valve islands will require a relatively complex network of supply lines for their operation, which can be difficult to install and expensive for the end-user. Furthermore, fault detection around this complex network can be troublesome. More recently valve islands have been constructed to make use of wireless communication technology to transfer data captured by the valve island. Every island needs power, air and a means of establishing communication.

Given that each valve island may be responsible for a number of different actuators located at different locations on the production machinery it can be difficult for the production machinery operator to effectively identify any fault therein and arrange for repair. It would be beneficial to be able to monitor the condition of the pneumatic and fluid control systems on and associated with the valve island, for example upstream compressors and air preparation equipment, as well as downstream systems, so that it is possible to perform condition monitoring and/or anticipate when a failure is about to occur. If a failure has already taken place, it would be beneficial to quickly and simply identify which component has failed.

EP1400702B1 discloses a control module to control and monitor functions of the valves. An external computer is used for monitoring and diagnosis via a fieldbus.

SUMMARY OF THE INVENTION

Aspects and embodiments of the invention provide a modular valve island and a pneumatic system as claimed in the appended claims.

According to an aspect of the invention, there is provided a modular valve island comprising: a plurality of valves; a supply exhaust module; a data communication module; and a diagnostic module; wherein at least one of the plurality of valves has at least one integrated sensor, wherein the at least one integrated sensor is configured to detect an operating condition of the modular valve island, wherein the at least one integrated sensor is electrically connected to the diagnostic module, to send sensor signals thereto, wherein the diagnostic module is configured to receive and process the sensor signals therein to identify the operating condition; and wherein the modular valve island is configured to provide data relating to the operating condition of the modular valve island via at least one of: a user interface provided in the diagnostic module; an industrial Ethernet link; or a wireless network and/or cloud communication link.

The present invention provides a modular valve island with integrated sensors, a diagnostic module and a data communications module. The modular valve island monitors operating conditions as well as giving warnings on interfacing products. The present invention provides a modular solution with a menu of diagnostic features, which customers can pick and choose from based on their specific problems and necessities. Having diagnostics on-board allows users to directly engage with the valve island at the point of use.

The modular valve island with integrated sensors, diagnostic module data communication module provides instantaneous diagnostics and fault resolution for any user—expressed in a clear, simple, intuitive way: colours—replacement part numbers—and simple instructions/suggestions on how to fix the issue/s arising. By monitoring the operating conditions and reporting on any departure from normal operating conditions, faults, or the development of faults may be brought to the attention of the user. Departures from normal operating conditions may allow for replacement and/or repair of parts of the overall operating system during scheduled maintenance, before a fault develops to such an extent that the overall system must be shut down for repair.

The modular valve island may further comprise a plurality of sub-bases, wherein each one of the plurality of valves is associated with a corresponding one of the plurality of sub-bases. Alternatively, the modular valve island may further comprise a manifold sub-base, wherein each one of the plurality of valves is associated with a corresponding portion of the manifold sub-base.

At least one integrated sensor may be provided on a sensor unit, the sensor unit being located between the plurality of valves and the plurality of sub-bases. Alternatively, the at least one integrated sensor may be provided on a sensor unit located between the plurality of valves and the manifold sub-base. A plurality of sensor units may be provided.

The data communication module and the diagnostic module may be combined as a single module. The modular valve island may further comprise at least one input/output module.

The operating condition may be a fault condition.

The at least one integrated sensor may comprise a first valve sensor to detect a valve mechanical property, preferably wherein the first valve sensor is a sensor configured to detect a valve spool position, preferably still wherein the first valve sensor is selected from one of an optical sensor, an inductive sensor, a magnetic sensor.

The at least one integrated sensor may further comprise a second valve sensor to detect a valve electrical property, preferably wherein the second valve sensor is an electrical sensor configured to detect a change in coil current and or voltage.

The modular valve island may further comprise a sub-base sensor integrated to the sub-base or sub-base manifold to detect a sub-base or sub-base manifold flow condition, and wherein the sub-base sensor is electrically connected to the diagnostic module, to send sensor signals thereto.

The sub-base sensor may be a flow pressure sensor provided in at least one of an inlet port of the sub-base or sub-base manifold, an output port of the sub-base or sub-base manifold, wherein the flow pressure sensor is configured to detect at least one of pressure, flow and temperature.

At least one sensor may be provided in the supply exhaust module to detect at least one of pressure, flow, air quality, and temperature and wherein the at least one supply exhaust module sensor is electrically connected to the diagnostic module, to send sensor signals thereto.

At least one sensor may be provided in the at least one input/output module to detect at least one of pressure, flow, air quality, and temperature and wherein the at least one input/output module sensor is electrically connected to the diagnostic module, to send sensor signals thereto.

The diagnostic user interface may be a display. The user interface may have orientation control.

According to a further aspect of the invention, there is provided a pneumatic system comprising the modular valve island as hereinbefore described, and at least one actuator or moveable element fluidly connected to the modular valve island.

The at least one actuator or moveably element may include a sensor electrically connected to the input/output module of the modular valve island.

The modular valve island thus monitors boundary conditions as well as giving warnings on interfacing products.

According to a yet further aspect of the invention, there is provided a sensor unit for a modular valve island, the sensor unit comprising a housing adapted to be electrically connected between a valve and a sub-base of the modular valve island, the sensor unit defining a plurality of passages between the valve and sub-base of the modular valve island so as to allow fluid flow therebetween, the sensor unit including at least one integrated sensor configured to detect an operating condition of the modular valve island.

The housing may comprise an upper surface adapted to fluidly connect with the plurality of passages of a valve of a modular valve island, and the housing may comprise a lower surface adapted to fluidly connect with plurality passages of a sub-base of a modular valve island.

The at least one integrated sensor may comprise a pressure sensor. The pressure sensor may be fluidly connected to a passage of the plurality of passages of a valve of a modular valve island.

A gasket may define, at least in part, the fluid connection between the pressure sensor and the passage. the gasket may be retained within a groove defined in the sensor unit.

The at least one integrated sensor may comprises an optical sensor. The optical sensor may be arranged so as not to disturb the flow through the passages. The optical sensor may be electrically connected to a Printed Circuit Board Assembly (PCBA) within the housing.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 1a is a front elevation of the valve island of the present invention according to a first embodiment;

FIG. 1b is a plan view of the valve island of FIG. 1a;

FIG. 2b is a plan view of the valve island of FIG. 2a;

FIG. 3b is a plan view of the valve island of FIG. 3a;

DETAILED DESCRIPTION

A valve island 100 comprises a plurality of valves 1.

Figures 1A, 1B:
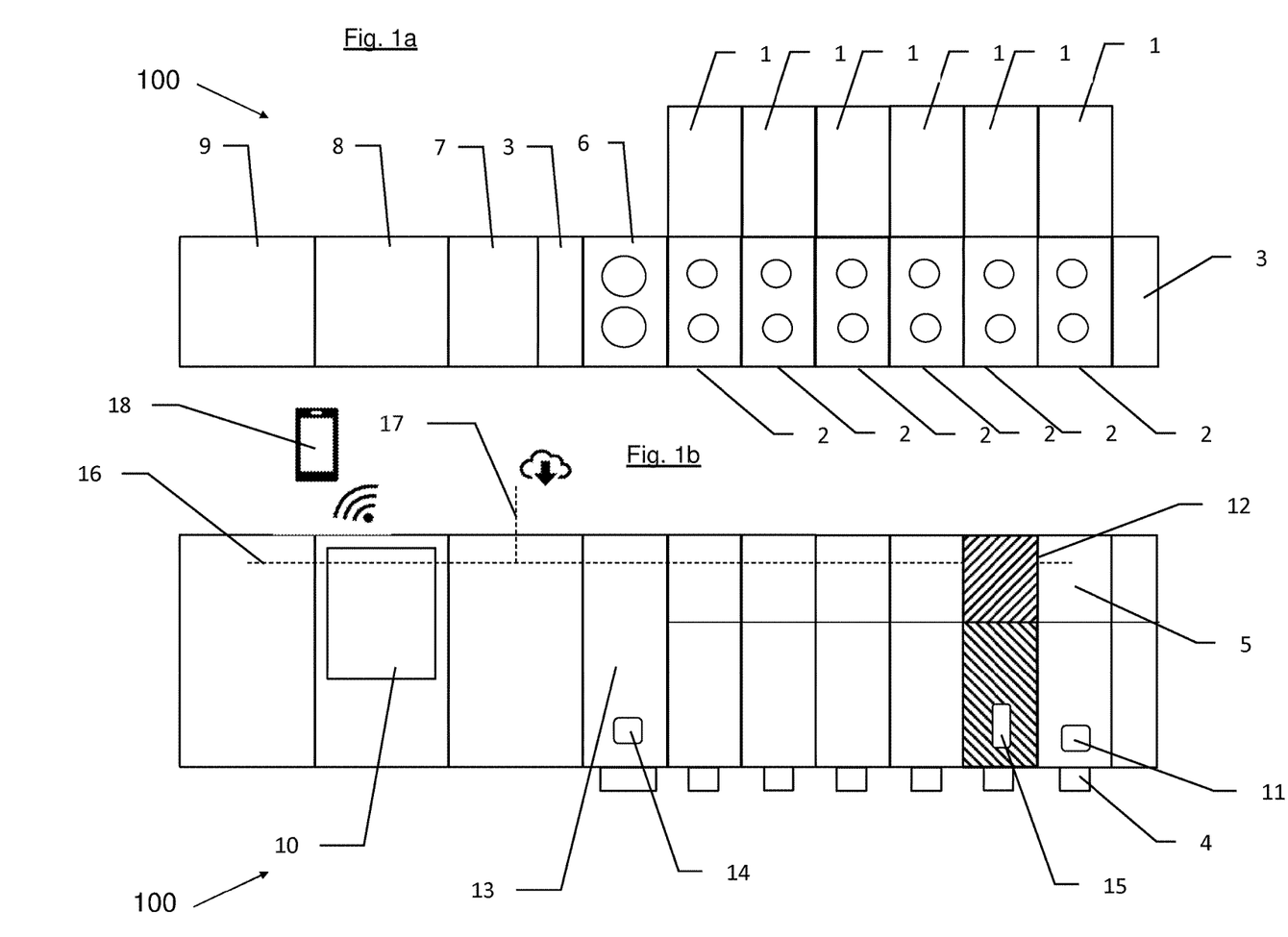

In the embodiment of FIGS. 1a and 1b, the plurality of valves 1 are mounted on top of a plurality of sub-bases 2. Each valve 1 and sub-base 2 is collectively termed a valve slice. Thus the valve island 100 is of a modular construction. The sub-bases 2 channel the air through the base of the valve island 100, provide a connection for the valve 1 to the air supply and also connection from the pneumatic device connected downstream of each valve 1. The sub-bases 2 are normally held together using clamps or tie-rods that fix through length of the valve island 100.

The plurality of sub-bases 2 are joined together in a row with a first end plate 3 attached at one end of the row of sub-bases 2. Attached to the other end of the row of sub-bases 2 is a supply exhaust module 6. Attached to the supply exhaust module 6 is a second end plate 3. Attached to the second end plate 3 is a data communication module 7. Attached to the data communication module 7 is a diagnostic module 8. In an alternate embodiment, the data communication module 7 and diagnostic module 8 are combined as a single module. Attached to the diagnostic module 8 is an input/output module 9. There may be more than one input/output module 9 provided on the valve island 100. As is understood in the art, the order of said modules and valves and sub-bases could vary depending upon the user requirements.

Each valve is responsible for controlling the direction of flow of pressurized fluid to and from a respective actuator or moveable element (not shown in FIG. 1). The term actuator or moveable element is used to describe a number of different features, including grippers, vacuum devices and valves. Pressurized fluid is supplied to the valve island 100 via the supply exhaust module 6.

The particular number of valves is dependent upon the application of the production machinery. In the specific example of FIG. 1, there are six valve slices, with six valves 1 mounted on top of six sub-bases 2. From right to left these valves 1 and sub-bases 2 are referred to as a first, second, third, fourth, fifth and sixth valve slices respectively. Each of the sub-bases 2 is provided with a pneumatic connection 4. The valve slices could be arranged in other combinations, not explicitly described herein.

Each of the valve slices is pneumatically connected to the supply exhaust module 6. Each of the valves 1 is a solenoid valve 5. Each of the solenoid valves 5 are electrically connected to the data communication module 7 and the diagnostic module 8, (or the combined data communication and diagnostic module).

The first sub-base 2 has a sub-base sensor integrated to the sub-base 2. The sub-base sensor is a flow pressure sensor 11. This can detect downstream pressure, flow and temperature through pneumatic connection 4 to any actuator or moveable element.

The second valve 1 has an intelligent coil 12. The solenoid valve has a printed circuit board electrically connected to the solenoid coil. As well as supplying electrical power to the solenoid coil, the printed circuit board can detect change in current and/or voltage to determine the performance of the solenoid coil. Thus the intelligent coil 12 monitors coil performance.

The second valve 1 also has an intelligent valve with optical sensors 15. The intelligent valve detects the position of the spool. The optical sensors 15 are arranged at either end of the intelligent valve. In an alternate embodiment, the intelligent valve has at least one magnetic sensor arrangement, instead of or in addition to, the optical sensors. In yet another alternate embodiment, the intelligent valve has at least one inductive sensor arrangement, instead of or in addition to, the optical sensors.

The third valve slice has a standard valve 1 and a standard sub-base 2.

The fourth valve slice has a standard valve 1 and a standard sub-base 2.

The fifth valve slice has a standard valve 1 and a standard sub-base 2.

The sixth valve slice has a standard valve 1 and a standard sub-base 2.

The supply exhaust module 6 is a diagnostic supply exhaust module (DSEM) 13 with integrated flow pressure. The supply exhaust module 6 may additionally have at least one environmental sensor 14.

An inlet pressure sensor is arranged on an inlet of the DSEM 13. The DSEM 13 detects the incoming pressure of the pressurized fluid, and the incoming flow of the pressurized fluid. An outlet pressure sensor is arranged on an outlet of the DSEM 13. The DSEM 13 detects the outgoing pressure of the pressurized fluid, and the outgoing flow of the pressurized fluid.

In use, any detected deviation from a normal operating condition—such as a set pressure, for example a set incoming pressure of 6 bar, or a set outgoing pressure of 3 bar, could indicate a fault or the development of a fault within valve island 100 or the associated actuator or moveable element. For example, such a fault could include pressurized fluid leakage in a particular valve 1 or in a particular actuator or moveable element.

The environmental sensor 14 monitors the humidity and/or water content and/or temperature of the incoming flow of the pressurized fluid. The environmental sensor 14 may also detect any oil/particulates/water droplets in the incoming flow of the pressurized fluid. The environmental sensor 14 may be a humidity sensor arranged on an inlet of the DSEM 13. The environmental sensor 14 may be a humidity sensor arranged on an outlet of the DSEM 13. The environmental sensor 14 may be an oil droplet/particulate sensor is arranged on an inlet of the DSEM 13. In use, the environmental sensor 14 may indicate the quality of the pressurized fluid entering the DSEM 13. More than one environmental sensor 14 may be used.

Each of the sensors in the valve island 100 are electrically connected to the diagnostic module 8. The diagnostic module 8 is configured to receive signals from each of the sensors of the valve island 100 via the electrical connection, as will be described in more detail below.

The data communication module 7 has a sub-bus 16. The data communication module 7 is provided with an industrial Ethernet link 17 via a Programmable Logic Computer (PLC). Thus the industrial Ethernet link 17 provides communication means between the valve island 100 and the PLC. The data communication module 7 is provided with a wireless network 18. Alternatively, or additionally, the data communication module 7 is provided with a cloud communication link 18. Signals from sensors go through data communication module 7, these can be sent to the PLC (without diagnostic processing). In normal use, the diagnostics are performed on the diagnostic module 8.

In another embodiment of the present invention, no wireless network and/or cloud communication link 18 is provided. Instead the data communication module 7 is solely provided with an industrial Ethernet link 17. As this is an Ethernet connection, there may be several other devices connected including a PLC. For example, an onsite or offsite Internet of Things (IoT) gateway to further cloud processing/industry 4.0 systems, or Open Platform Communications Unified Architecture (OPC-UA) devices for monitoring or analysis, or local users on the connected network may view the web pages from the device. More than one network connection may be used for either control or data communication.

The diagnostic module 8 has diagnostic user interface. The diagnostic user interface may be a colour display screen 10. The colour display screen 10 may be a Liquid Crystal Display (LCD). The colour display screen 10 may be a full colour Thin Film Transistor (TFT) LCD. Alternatively the colour display screen 10 may be an organic light emitting diode (OLED) display. The user interface has orientation control such that the valve island 100 may be installed in any orientation. Colour display screen 10 may be detachable, or use existing HMI The diagnostic module 8 has a built in Machine Intelligence Unit (MIU). The MIU may comprise a Printed Circuit Board (PCB) and processor, where the PCB receives the various signals which are interpreted by the processor. The processor performs the necessary algorithms to monitor the operating conditions and identify any changes or departure from the operating conditions which may indicate a fault or the development of a fault identifiable from the signals. The MIU is software capable of capturing data from all connected sensors, storing said data and using built in algorithms process this data to provide useful notifications. The diagnostic module 8 collects and processes data from the sensors within the valve island 100, and upstream and downstream (components before and after the valve island) of the pneumatic system. The diagnostic module 8 also has the capability to collect and offload the data from the sensors to an alternate site via the data communication module 7. The alternate site may be, for example, a cloud service.

The sensor signals from the intelligent coil 12 and the intelligent valve may be combined such that their respective sensors are treated as a pair of integrated sensors. Thus the signal from from the optical sensors 15, which indicate for example spool position, are combined with the signals from the intelligent coil 12, which indicate whether the coil has switched and thus which position the spool should be in, are used by the machine intelligence unit to identify a departure from the normal or expected operating condition and thus if a fault exists or there is a risk of the development of a fault.

The input/output module 9 allows for connecting external system devices and sensors through the valve island 100 to the PLC. The input/output module 9 is electrically connected through the diagnostic module 8 to the data communication module 7. Any data from those sensors can be interrogated by the diagnostic module 8 in combination with the signals for sensors 11, 12, 15. For example a position sensor on an actuator (to detect stroke position of the actuator). This signal can be combined with the measured signals from the coil and valve to identify an operating condition.

The data communication module 7 and diagnostic module 8 can together perform operating condition monitoring. This may be by monitoring the sensing data to create an operational baseline and then iteratively comparing cyclic data against this operational baseline.

The data communication module 7 and diagnostic module 8 can together communicate an operating condition out locally via the colour display screen 10 on the diagnostic module 8. The data communication module 7 and diagnostic module 8 can together communicate an operating condition out remotely, either via the industrial Ethernet link 17 or via the wireless network and/or cloud communication link 18. These can be displayed to the production machinery operator via hand held devices such as mobile telephones, tablets or laptop computers. Departures from the normal operating condition, and thus faults or the development of faults are communicated using a status/warning message. The status/warning message identifies the location and type of fault. The status/warning message may identify the resolution.

When a control valve or its respective actuating cylinder indicates a reduced performance, a visual indication is provided via the user interface provided in the diagnostic module and/or via the industrial Ethernet link and/or the wireless network and/or cloud communication link 18 as described above. This allows the control valve or actuating cylinder to be replaced at the next convenient maintenance opportunity.

The operating conditions and faults or development of faults that can be identified include: Stuck valve; Valve leakages; Pressure changes; Cycle count; Flow changes; Air consumption (i.e. flow); Energy consumption (i.e. power); Air quality (e.g. particles, humidity, etc.); Solenoid/coil performance/issues; Issues with actuators/sensors (e.g. leakage, stuck actuator, etc.); Valve end position; Faulty or sticking spool. Within the diagnostics, what is happening in the valve and where, i.e. which valve is identified and displayed as part of the status/warning message.

Figure 2A:
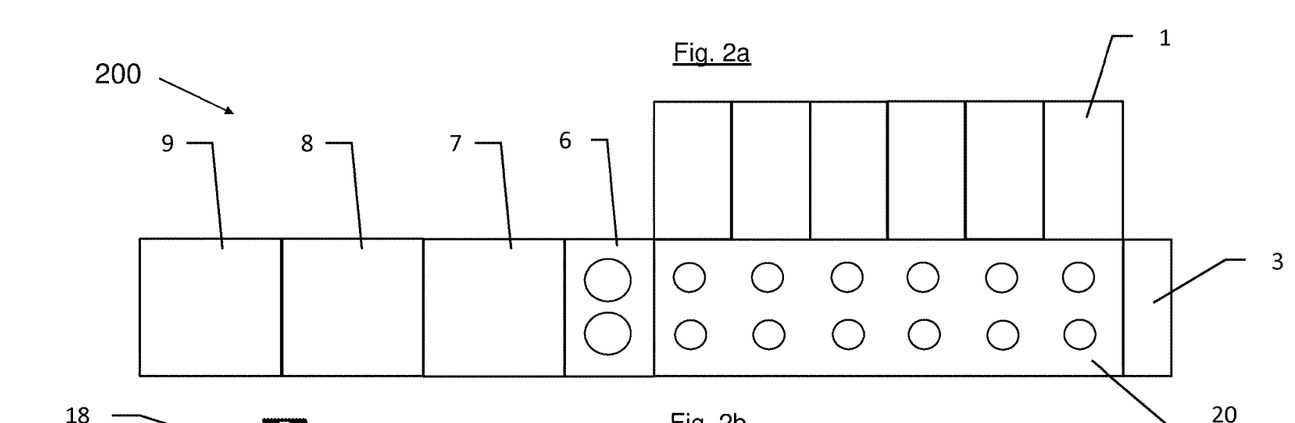
FIG. 2a is a front elevation of the valve island of the present invention according to a second embodiment.
Figure 2B:
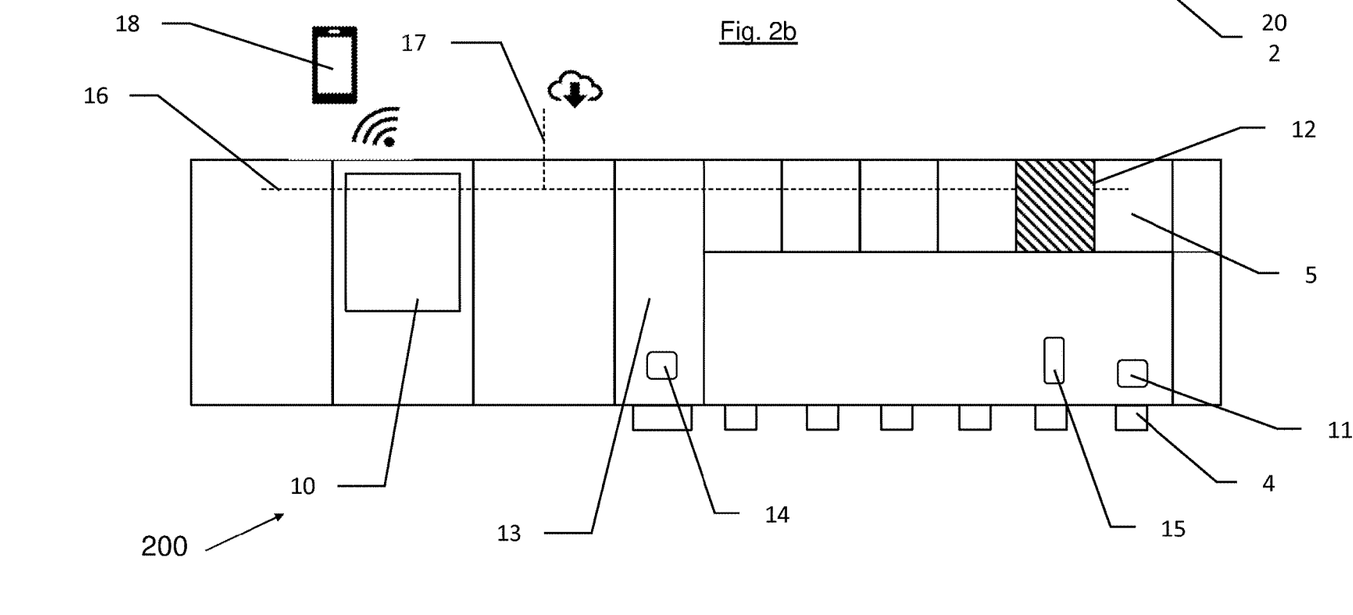

The data communication module 7 and diagnostic module 8 can together allow of update of algorithms from external source. Software update on the node sent remotely (rather than local updates), Advantage of having external connection in combination with on-board diagnostics module. A sub-program may be stored on the data communication module 7 and diagnostic module 8 which can be activated on command of the PLC that changes actuation characteristic of valves A valve island 200 in accordance with a second embodiment of the present invention is shown in FIGS. 2a and 2b. The valve island 200 is similar to the valve island 100, such that similar reference numbers are used and only the main differences of valve island 200 shall be described in detail.

The valve island 200 has a plurality of valves 1 which are mounted on top of a manifold sub-base 202. Each valve 1 is associated with a corresponding portion of the manifold sub-base 202.

Figure 3A:
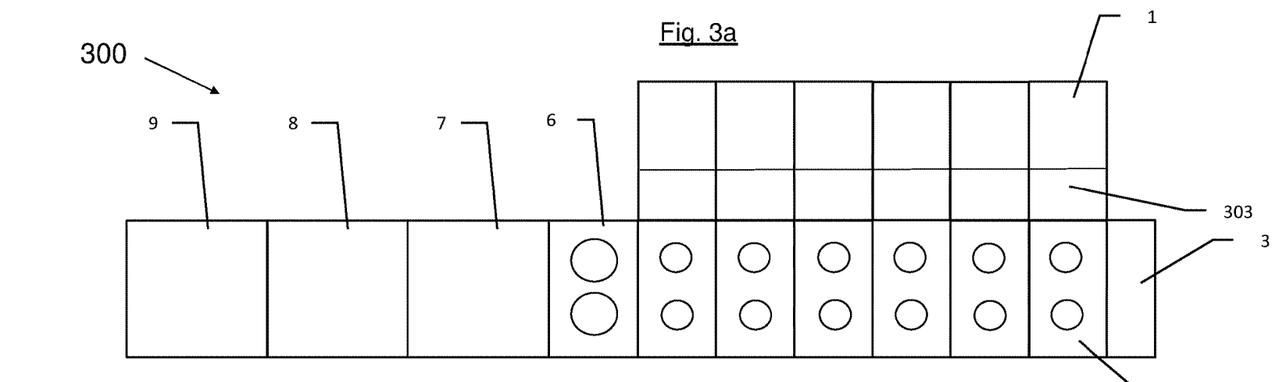
FIG. 3a is a front elevation of the valve island of the present invention according to a third embodiment.
Figure 3B:
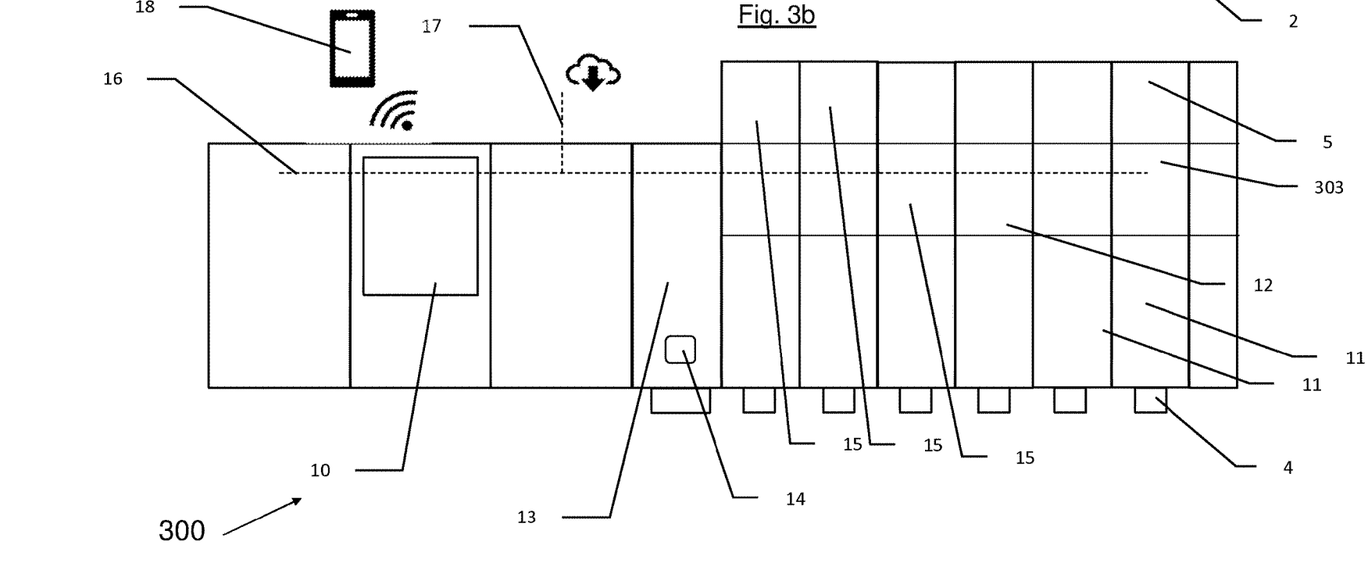

A valve island 300 in accordance with a third embodiment of the present invention is shown in FIGS. 3a and 3b. The valve island 300 is similar to the valve island 100, such that similar reference numbers are used where appropriate and only the main differences of valve island 300 shall be described in detail.

Like valve island 100, in valve island 300 the plurality of valves 1 are mounted on top of a plurality of sub-bases 2. Each valve 1 and sub-base 2 is collectively termed a valve slice. Thus the valve island 300 is of a modular construction. The sub-bases 2 channel the air through the fluid connections 20 in the base of the valve island 100, provide a connection for the valve 1 to the air supply 312 and also pneumatic connection 4 from the pneumatic device connected downstream of each valve 1. The plurality of valves 1 of valve island 300 are mounted on top of a plurality of sub-bases 2, with a plurality of sensor units 303 located there between in a sandwich arrangement. Each sensor unit 303 has at least one integrated sensor. The sensor units 303 are responsible for sensing properties of the valve slice such that individual sensors may not be required.

In the specific embodiment of valve island 300 of FIG. 3, the first sensor unit 303 has a sub-base sensor which is a flow and/or pressure sensor 11. The second sensor unit 303 has a sub-base sensor which is a flow and/or pressure sensor 11. The third sensor unit 303 has an intelligent coil sensor 12, which is located in the sensor unit 303 as opposed to in the valve 1 as per valve island 100. The fourth sensor unit 303 has an intelligent valve optical sensor 15, which is located in the sensor unit 303 as opposed to in the valve 1 as per valve island 100. The fifth sensor unit 303 has an intelligent valve magnetic sensor 15. The sixth sensor unit 303 has an intelligent valve inductive sensor 15.

Figure 4:
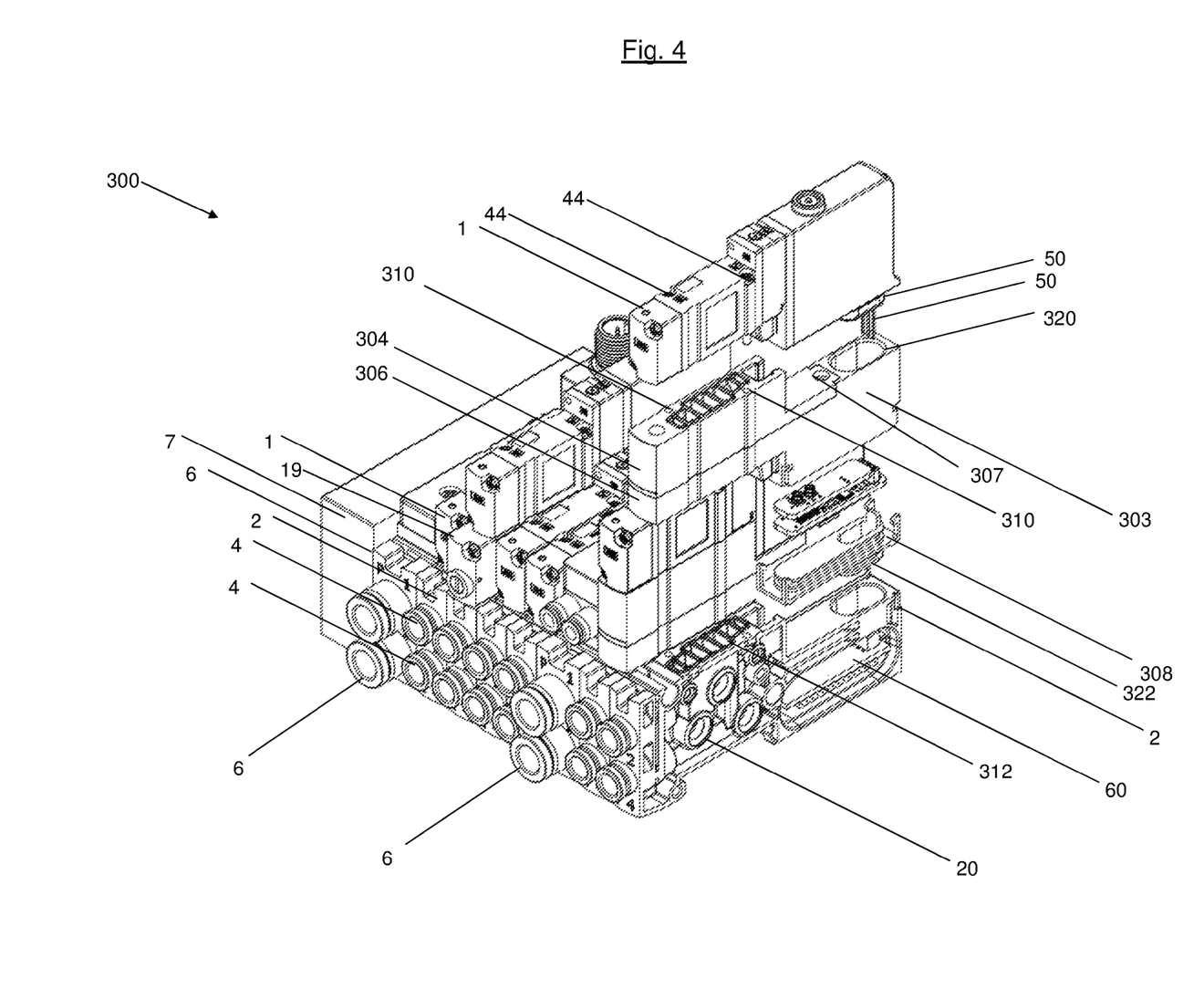
FIG. 4 is a partial exploded view of the valve island of FIG. 3a, in an alternate configuration.

Referring to FIG. 4, valve island 300 is shown in an alternate configuration, with a number of valves 1 mounted directly on top of corresponding sub-bases 2 (like valve island 100), and a number of valves 1 mounted on top of sensor units 303, the sensor units being mounted on top of the corresponding sub-bases 2. Additionally, a shut off valve 19 is mounted on top of a sub-base 2, and two supply exhaust modules 6 are provided.

The sensor unit 303 comprises a top housing 304, a middle housing 306 and a bottom piece 308. The top housing 304 connects to the middle housing with a snap fit and/or screwed connection 307. The bottom piece 308 connects to the middle housing 306 with a snap fit.

Externally, each sensor unit 303 co-operates in form with the valve slice comprising the valve 1 and sub-base 2 of valve island 300. As such two sensor units 303 may be positioned side by side in adjacent valve slices, as shown in FIG. 4. This arrangement allows the sensor unit 303 to measure the pressure on each side of the spool 22. Screw bores 310 allow screws 44 to pass through the assembled sensor unit 303, to connect the valve 1 and sub-base 2 of the valve slice.

Internally, the sensor unit 303 is adapted to co-operate with the pneumatic galleries 312 of the valve 1 and sub-base 2. The sensor unit 303 is adapted to accommodate electrical connections between the valve 1 and sub-base 2. An inner surface of a sensor cavity 320 engages with a valve connector seal 52. Likewise, a sensor unit connector seal 322 engages with an inner surface of a sensor cavity provided in the sub-base 2.

Pneumatic Connections

Figure 5:
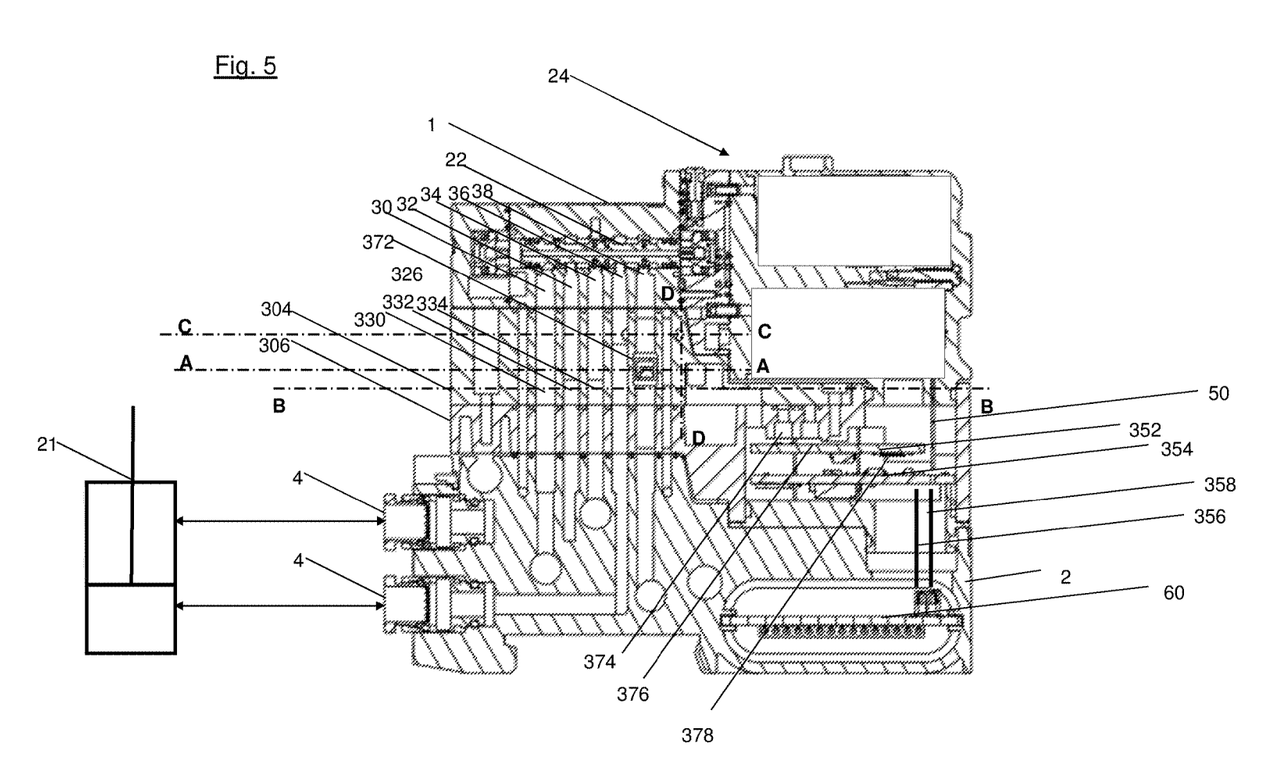
FIG. 5 is a cross section through a valve slice of the valve island of FIG. 4, taken at the mid-place of a valve slice.

Referring to FIG. 5, a cross sectional view of a valve slice incorporating sensor unit 303 is shown. The cross section is taken at the mid-plane of the non-exploded valve 1 and sensor unit 303 combination.

A standard valve 1 has spool 22 and solenoid 24 arrangement. Movement of the spool 22 controls pneumatic flow through the individual passages 30, 32, 34, 36, 38 of pneumatic galleries 312 as is known in the art. The drives movement of an exemplary actuator 21 via the pneumatic connections 4.

The top housing 304 and middle housing 306 have passages 330, 332, 334, 336, 338 which fluidly connect to passages 30, 32, 34, 36, 38 of valve 1, collectively termed pneumatic galleries 312, and their equivalent passages within sub-base 2.

Figure 8:
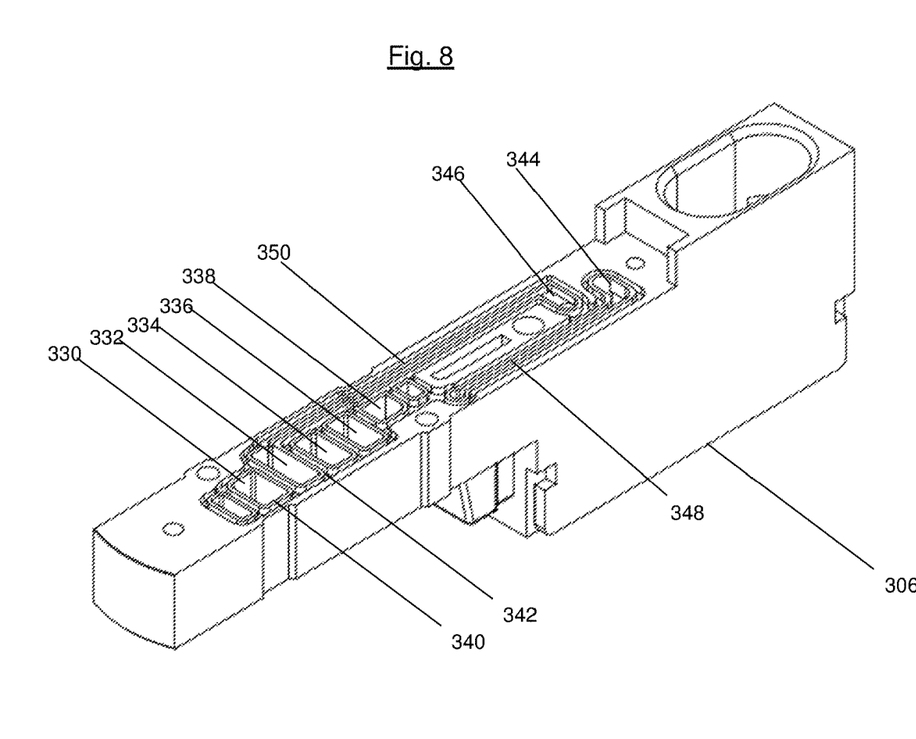
FIG. 8 is an isometric view of a portion of a sensor unit.

The middle housing 306 is shown in detail in FIG. 8. A delivery pathway 348 fluidly connects a deliver sensing chamber 344 to the passage 336 which comprises the main supply of the valve slice. A supply pathway 350 fluidly connects a supply sensing chamber 346 to the passage 332, which comprises a first delivery passage of the valve slice.

A one-piece gasket 340 is provided on an upper surface of the middle housing 306. The gasket is seated in a groove 342 provided in the upper surface of the middle housing 306. The gasket 340 is arranged to surround each of the passages 330, 332, 334, 336, 338, together with their respective delivery pathways and sensing chambers.

The supply pathway 350 utilises the form of the gasket 340 to fluidly connect the supply sensing chamber 346 to the passage 332.

Figure 9:
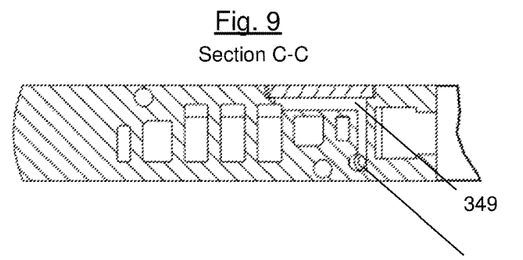
FIG. 9 is a cross section through a forward portion of the sensor unit of FIG. 5 at line C-C.
Figure 10:
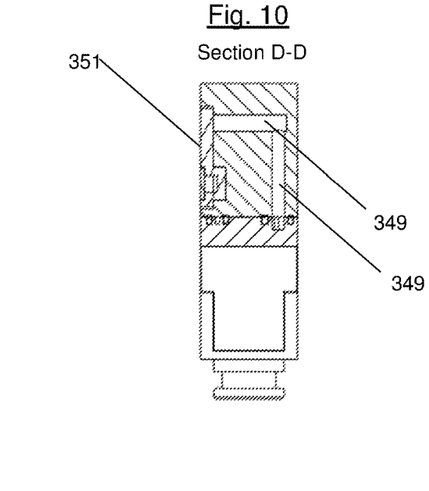
FIG. 10 is a vertical cross section through a forward portion of the sensor unit of FIG. 5 at line D-D.

The delivery pathway 348 relies upon both the form of the gasket 340 but also a bypass pathway 349, shown in FIGS. 9 and 10, to fluidly connect the deliver sensing chamber 344 to the passage 336. An ultrasonically welded plate 351 may block a portion of the bypass pathway 349.

Electrical Connections

Referring back to FIG. 5, the sensor unit 303 is provided with two Printed Circuit Board Assemblies (PCBAs) 352, 354. The PCBAs 352, 354 are electrically connected to one another. In an alternate embodiment, any number of PCBAs may be provided. The lower PCBA 354 is electrically connected to valve electrical connector array 50. The valve electrical connector array 50 carries power and electrical signals between the valve 1 and sub-base 2. The sensor unit 303 has a pass on connector array 358 which is electrically connected to a sub-base Printed Circuit Board Assembly 60. The sensor unit 303 may have an additional connector array 356 depending upon the application. The sub-base Printed Circuit Board Assembly 60 is electrically connected to the sub-bus 16 of the data communication module 7 through the valve island 300.

Sensors

Figure 6:
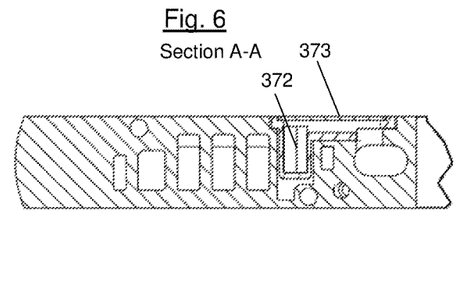
FIG. 6 is a cross section through a forward portion of the sensor unit of FIG. 5 at line A-A.
Figure 7:
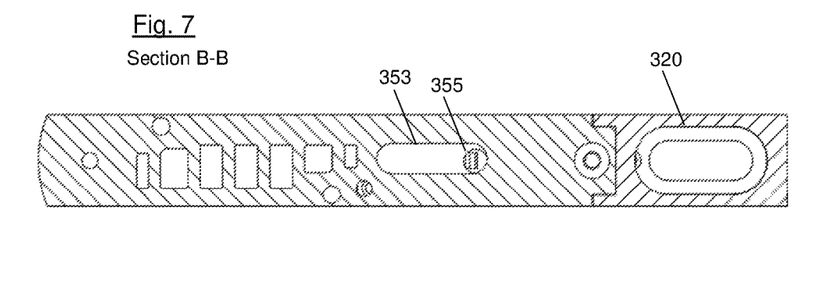
FIG. 7 is a cross section through the sensor unit of FIG. 5 at line B-B.

The upper PCBA 352 is electrically connected to optical sensor 372. The optical sensor 372 is aligned within passage 328. In accordance with the specific embodiment show the optical sensor 372 is aligned within the exhaust passage 328. The optical sensor 372 is arranged so as not to disturb the flow within the exhaust passage 328. The optical sensor 372 observes the position of the spool 22. The optical sensor 372 may observe the position of the spool 22 by shining a light against the spool 22 and detecting a difference in a reflected light signal between the spool 22 and a seal on the spool 22. The optical sensor 372 may be secured in place against ultrasonically welded plate, as shown in FIG. 6. The optical sensor 372 is electrically connected to a connector 355 on the upper PCBA 352 via a wired connection routed through the sensor unit 303, in particular through pocket 353.

The upper PCBA 352 has first pressure sensor 372 and second pressure sensor 374. The first pressure sensor 372 is fluidly connected to delivery sensing chamber 344. The second pressure sensor 374 is fluidly connected to supply sensing chamber 346.

The upper PCBA 352 has current sensor 376. Current sensor 376 senses current draw of the pilot valve solenoids.

The sub-bases 2 are held together using clamps or tie-rods that fix through length of the valve island 100. The valves 1 will wear over time and will require replacing. For ease of replacement the valves 1 are designed such that they can be easily removed from the sub-base 2 without the need for dismantling the valve island 300. This is normally achieved (for example in valve island 100) using screws 44 that secure the valve 1 directly to the sub-base 2. This allows users to easily replace or upgrade/change valve function with the valve island 100 in situ. The valve island 300 maintains these benefits in the application of adding sensors.

By having sensor units 303 that fit between the sub-base 2 and valve 1 it is not necessary have a specialised sub-base 2. Also, this means that users who wish to upgrade their valve islands to add sensors or switch sensing between different channels can do so easily without dismantling the valve island 300. The sensor units 303 allow the standard valve electrical connector array 50 for the valve 1 to "pass-thru" and connect to the sub-base Printed Circuit Board Assembly (PCBA) 60 eliminating the need for any modifications or additional connectors.

The sensor electronics within the sensor units 303 are compatible with any type of valve 1, and therefore can be used interchangeably within the valve island 300.

In a fourth embodiment of the present invention (not shown), the plurality of sensor units are sandwiched between the plurality of valves and a manifold sub-base, wherein the plurality of sensor units are associated with a corresponding portion of the manifold sub-base In an alternate embodiment, the sensor units 303 may be provided atop a further functional element, such as a shut off valve. Thus the valve slice comprises a standard valve 1, sensor unit 303, shut off valve and the sub-base 2.

LIST OF REFERENCE NUMBERS

| | |
|---|---|
| valve 1 | valve island 100, 200, 300 |
| sub-base 2 | manifold sub-base 202 |
| end plate 3 | sensor unit 303 |
| pneumatic connection 4 | top housing 304 |
| solenoid valve 5 | middle housing 306 |
| supply exhaust module 6 | screwed connection 307 |
| data communication module 7 | bottom piece 308 |
| diagnostic module 8 | screw bores 310 |
| input/output module 9 | pneumatic galleries 312 |
| colour display screen 10 | sensor cavity 320 |
| integrated base flow pressure sensor 11 | sensor unit connector seal 322 |
| intelligent coil 12 | 330 passage |
| diagnostic supply exhaust module 13 | 332 passage |
| integrated flow pressure and environmental sensor 14 | 334 passage |
| | 336 passage |
| optical sensors 15 | 338 exhaust passage |
| sub-bus 16 | gasket 340 |
| industrial Ethernet link 17 | groove 342 |
| wireless network and/or cloud communication link 18 | delivery sensing chamber 344 |
| | supply sensing chamber 346 |
| shutoff valve 19 | delivery pathway 348 |
| fluid connections 20 | bypass pathway 349 |
| exemplary actuator 21 | supply pathway 350 |
| spool 22 | plate 351 |
| solenoid 24 | upper Printed Circuit Board Assembly (PCBA) 352 |
| passage 30 | |
| passage 32 | pocket 353 |
| passage 34 | lower Printed Circuit Board Assembly (PCBA) 354 |
| passage 36 | |
| passage 38 | connector 355 |
| screws 44 | pass on connector 358 |
| valve electrical connector array 50 | optical sensor 372 |
| valve connector seal 52 | plate 373 |
| sub-base Printed Circuit Board Assembly (PCBA) 60 | first pressure sensor 374 |
| | second pressure sensor 376 |
| | current sensor 378 |

The invention claimed is:

1. A modular valve island comprising:
   a plurality of valves;
   a plurality of sub-bases, wherein each one of the plurality of valves is associated with a corresponding one of the plurality of sub-bases;
   a supply exhaust module;
   a data communication module; and
   a diagnostic module,
   wherein at least one of the plurality of valves has at least one integrated sensor, wherein the at least one integrated sensor is configured to detect an operating condition of the modular valve island, wherein the at least one integrated sensor is electrically connected to the diagnostic module to send sensor signals thereto,
   wherein the diagnostic module is configured to receive and process the sensor signals therein to identify the operating condition, and
   wherein the modular valve island is configured to provide data relating to the operating condition of the modular valve island via at least one of:
      (i) a user interface provided in the diagnostic module,
      (ii) an industrial Ethernet link, or
      (iii) a wireless network and/or cloud communication link,
   wherein the at least one integrated sensor is provided on a sensor unit, the sensor unit located between the plurality of valves and the plurality of sub-bases,
   wherein the sensor unit comprises:
      a housing adapted to be electrically connected between a valve and a sub-base of the modular valve island, the sensor unit defining a plurality of passages between the valve and the sub-base of the modular valve island to allow fluid flow therebetween, the sensor unit including the at least one integrated sensor, wherein the at least one integrated sensor comprises a pressure sensor, and wherein the pressure sensor is fluidly connected to a passage of the plurality of passages of the sensor unit, and wherein the sensor unit further comprises (i) a sensing chamber via which the pressure sensor senses pressure level, and (ii) a gasket that defines, at least in part, a fluid connection between the passage and the sensing chamber.

2. The modular valve island of claim 1, wherein the modular valve island further comprises a manifold sub-base, wherein each one of the plurality of valves is associated with a corresponding portion of the manifold sub-base.

3. The modular valve island of claim 2, wherein the at least one integrated sensor is provided on the sensor unit, the sensor unit located between the plurality of valves and the manifold sub-base.

4. The modular valve island of claim 3, comprising a plurality of sensor units.

5. The modular valve island of claim 2, further comprising a sub-base sensor integrated to a sub-base of the plurality of sub-bases or sub-base manifold to detect a sub-base flow condition or a sub-base manifold flow condition, and wherein the sub-base sensor is electrically connected to the diagnostic module to send sensor signals thereto.

6. The modular valve island of claim 5, wherein the sub-base sensor is a flow pressure sensor provided in at least one of an inlet port of the sub-base or sub-base manifold, an output port of the sub-base or sub-base manifold, wherein the flow pressure sensor is configured to detect at least one of pressure, flow and temperature.

7. The modular valve island of claim 1, wherein the data communication module and the diagnostic module are combined as a single module.

8. The modular valve island of claim 1, wherein the modular valve island further comprises at least one input/output module.

9. The modular valve island of claim 8, wherein at least one sensor is provided in the at least one input/output module to detect at least one of pressure, flow, air quality, and temperature, and wherein the at least one sensor of the at least one input/output module is electrically connected to the diagnostic module to send sensor signals thereto.

10. The modular valve island of claim 1, wherein the operating condition is a fault condition.

11. The modular valve island of claim 1, wherein the at least one integrated sensor comprises a first valve sensor to detect a valve mechanical property, preferably wherein the first valve sensor is a sensor configured to detect a valve spool position, preferably still wherein the first valve sensor is selected from one of an optical sensor, an inductive sensor, a magnetic sensor.

12. The modular valve island of claim 1, wherein the at least one integrated sensor further comprises a second valve sensor to detect a valve electrical property, preferably wherein the second valve sensor is an electrical sensor configured to detect a change in coil current and or voltage.

13. The modular valve island of claim 1, wherein at least one sensor is provided in the supply exhaust module to detect at least one of pressure, flow, air quality, and temperature, and wherein the at least one sensor of the supply exhaust module is electrically connected to the diagnostic module to send sensor signals thereto.

14. The modular valve island of claim 1, wherein the user interface of the diagnostic module is a display, wherein the user interface has orientation control.

15. A pneumatic system comprising the modular valve island of claim 1, and at least one actuator or moveable element fluidly connected to the modular valve island.

16. The pneumatic system of claim 15, wherein the at least one actuator or moveable element includes a sensor electrically connected to an input/output module of the modular valve island.

17. The modular valve island of claim 1, wherein the housing comprises an upper surface adapted to fluidly connect with a respective plurality of passages of the valve of the modular valve island; and wherein the housing comprises a lower surface adapted to fluidly connect with another respective plurality of passages of the sub-base of the plurality of sub-bases.

18. The modular valve island of claim 1, wherein the gasket is retained within a groove defined in the sensor unit.

19. The modular valve island of claim 1, wherein the at least one integrated sensor comprises an optical sensor.

20. The modular valve island of claim 19, wherein the optical sensor is arranged so as not to disturb fluid flow through the passages.

21. The modular valve island of claim 20, wherein the optical sensor is electrically connected to a Printed Circuit Board Assembly (PCBA) within the housing.

22. The modular valve island of claim 1, wherein the gasket is a one-piece gasket that surrounds the passage and the sensing chamber.

* * * * *